(12) United States Patent
Thai et al.

(10) Patent No.: US 11,620,298 B2
(45) Date of Patent: Apr. 4, 2023

(54) METHOD FOR SCALABLE MINING OF TEMPORALLY CORRELATED EVENTS

(71) Applicant: International Business Machines Corporation, Armonk, NY (US)

(72) Inventors: Vinh Tuan Thai, Cork (IE); Luke Taher, Heswall (GB); Mark O'Riordan, Cork (IE)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 16/860,974

(22) Filed: Apr. 28, 2020

(65) Prior Publication Data

US 2021/0334277 A1 Oct. 28, 2021

(51) Int. Cl.
| | |
|---|---|
| G06F 17/00 | (2019.01) |
| G06F 7/00 | (2006.01) |
| G06F 16/2458 | (2019.01) |
| G06F 7/14 | (2006.01) |
| G06Q 30/016 | (2023.01) |

(52) U.S. Cl.
CPC .......... *G06F 16/2465* (2019.01); *G06F 7/14* (2013.01); *G06Q 30/016* (2013.01)

(58) Field of Classification Search
CPC ...... G06F 16/2465; G06F 7/14; G06Q 30/016
USPC ........................................................ 707/776
See application file for complete search history.

(56) References Cited

U.S. PATENT DOCUMENTS

| | | | |
|---|---|---|---|
| 8,583,586 B2 | 11/2013 | Ebadollahi et al. | |
| 11,423,199 B1* | 8/2022 | Hoff | G06F 30/20 |
| 2005/0114508 A1* | 5/2005 | DeStefano | G06F 11/3082 |
| | | | 709/224 |
| 2005/0114708 A1* | 5/2005 | DeStefano | H04L 63/1425 |
| | | | 726/4 |
| 2006/0184529 A1* | 8/2006 | Berg | G06F 11/079 |
| | | | 714/E11.026 |
| 2009/0105935 A1* | 4/2009 | Jha | G08G 5/0034 |
| | | | 701/120 |
| 2017/0372033 A1 | 12/2017 | Hu et al. | |
| 2018/0004816 A1 | 1/2018 | Mozes et al. | |

FOREIGN PATENT DOCUMENTS

CN 107273470 A 10/2017

OTHER PUBLICATIONS

"RoaringBitmap", GitHub, downloaded from the internet on May 4, 2021, 9 pages, <https://github.com/RoaringBitmap/RoaringBitmap>.
Li et al. "PFP: Parallel FP-Growth for Query Recommendation", Proceedings of the 2008 ACM Conference on Recommender Systems, RecSys 2008; Jan. 2008.

(Continued)

*Primary Examiner* — Pavan Mamillapalli
(74) *Attorney, Agent, or Firm* — Nicholas A. Welling

(57) ABSTRACT

Scalable mining method, computer system and computer program product for temporally correlated events that works with input data that is non-transactional in nature and detects high correlation relationships between events with low support thresholds. The scalable mining method manages a large scale of input data by executing the mining process in a distributed manner in a clustered cloud environment via nodes.

17 Claims, 5 Drawing Sheets

(56) References Cited

OTHER PUBLICATIONS

"Association rule learning"; Wikipedia; retrieved from https://en.wikipedia.org/wiki/Association_rule_learning; as early as Apr. 2005.
Agrawal et al. "Fast Algorithms for Mining Association Rules"; Proceedings of the 20th VLDB Conference; 1994.
Han et al. "Mining Frequent Patterns without Candidate Generation"; Proceedings of the 2000 ACM SIGMOD International conference on Management of data; 2000.
"Frequent Pattern Mining"; retrieved from https://spark.apache.org/docs/latest/ml-frequent-pattern-mining.html; as early as Jul. 2017.
Makanju et al. "Deep parallelization of parallel FP-growth using parent-child MapReduce." 1422-1431. 10.1109/BigData.2016.7840750; 2016.
Wang et al. "Efficient alarm behavior analytics for telecom networks", Information Sciences, vol. 402, 2017, pp. 1-14, ISSN 0020-0255; 2017.
Cohen et al."Finding Interesting Associations without Support Pruning." IEEE Trans. on Knowl. and Data Eng. Jan. 13, 2001.
Pei et al. "Mining sequential patterns by pattern-growth: The PrefixSpan approach." IEEE Transactions on Knowledge and Data Engineering. 6. 1-17; 2004.
Indyk et al. "Approximate Nearest Neighbors: Towards Removing the Curse of Dimensionality"; In Proceedings of the thirtieth annual ACM symposium on Theory of computing (STOC '98). ACM, New York, NY, USA, 604-613; 1998.
"MinHash for Jaccard Distance"; retreived from https://spark.apache.org/docs/latest/ml-features.html#minhash-for-jaccard-distance; as early as Jul. 2015.
Shum, Stephen. "The Basics of Audio Fingerprinting"; retreived from http://people.csail.mit.edu/sshum/talks/audio_fingerprinting_sls_24Oct2011.pdf; Oct. 2011.
"Jaccard index"; Wikipedia; retrieved from https://en.wikipedia.org/wiki/Jaccard_index; as early as Dec. 2005.
"Hamming distance"; Wikipedia; retrieved from https://en.wikipedia.org/wiki/Hamming_distance; as early as Jun. 2004.
Toivonen et al. "Pruning and Grouping Discovered Association Rules"; retrieved from http://citeseerx.ist.psu.edu/viewdoc/versions?doi=10.1.1.40.4740; 1995.
Silberschatz et al. "What Makes Patterns Interesting in Knowledge Discovery Systems"; IEEE Transactions on Knowledge and Data Engineering, vol. 8, Issue: 6, Dec. 1996.
Marinica et al. "Post-Processing of Discovered Association Rules Using Ontologies"; 2008 IEEE International Conference on Data Mining Workshops; Dec. 2008.
Hahsler, M. "Grouping Association Rules Using Lift"; Proceedings of the 11th INFORMS Workshop on Data Mining and Decision Analytics; 2016.
Li et al. "Mining Frequent Patterns by Differential Refinement of Clustered Bitmaps"; Proceedings of the Sixth SIAM International Conference on Data Mining; Jul. 2006.

\* cited by examiner

METHOD FOR SCALABLE MINING OF TEMPORALLY CORRELATED EVENTS

BACKGROUND

The present invention relates to temporally correlated events, and more specifically to scalable mining of temporally correlated events.

A customer's network operations center (NOC) is typically inundated with events from a huge variety of sources, with NOC users needing to prioritize the most important events and typically not acting on the least important events per the prioritization. For this reason, it is useful to take advantage of intelligent methods to reduce the volume of events by grouping related events together. Another benefit of the grouping is to bring together events that contribute to a problem, adding context for the NOC user, and thus helping the NOC user to act on the problem.

Related event grouping has been carried out previously. A simple example of related event grouping is the grouping of events that belong to the same node. A similar, but more complex example is the grouping of events that are topologically related. Some analytics may be produced to detect the seasonality of events so that events that happen within a specific time period can be deprioritized. The specific time period can be weekly. While this plurality of extracted relationships provides an advantage in that the relationships provide additional useful information, the plurality of extracted relationships also poses a significant challenge in terms of consumption due to the large amount of separate sets of relationships and how the large amount of separate sets of relationships can be combined together into a structure that can be presented to the end NOC users, so that actions can be taken by the NOC users.

SUMMARY

According to one embodiment of the present invention, a method of scalable mining of temporally correlated events is disclosed. The method comprising the steps of: a computer recording event occurrences as bitmaps at least at a fine grained interval and a coarse grained interval into a bitmap data structure; the computer filtering out events occurrences which occur above and below a minimum and maximum designated thresholds relative to the fine grained interval and the coarse grained interval; the computer identifying events occurrences having a same event occurrence bitmap at the fine grained interval and the coarse grained interval and placing the same event occurrence bitmaps into groups; the computer removing duplicate event occurrence bitmaps at the fine grained intervals within the groups; the computer creating transactions based on the groups; for each transaction created, applying optimized parallel frequent pattern (FP) growth to a plurality of other distributed computers to produce result sets; the computer merging all result sets from the plurality of distributed computers; the computer applying rule filtering and outputting remaining groups of events; and the computer representing the remaining groups as a distributed graph to output merged groups of temporally correlated events.

According to another embodiment of present invention, a computer program product for scalable mining of temporally correlated events using a computer is disclosed. The computer comprising at least one processor, one or more memories, one or more computer readable storage media, the computer program product comprising a computer readable storage medium having program instructions embodied therewith. The program instructions executable by the computer to perform a method comprising: recording, by the computer event occurrences as bitmaps at least at a fine grained interval and a coarse grained interval into a bitmap data structure; filtering out, by the computer, events occurrences which occur above and below a minimum and maximum designated thresholds relative to the fine grained interval and the coarse grained interval; identifying, by the computer, events occurrences having a same event occurrence bitmap at the fine grained interval and the coarse grained interval and placing the same event occurrence bitmaps into groups; removing, by the computer, duplicate event occurrence bitmaps at the fine grained intervals within the groups; creating, by the computer, transactions based on the groups; for each transaction created, applying, by the computer, optimized parallel FP growth to a plurality of other distributed computers to produce result sets; merging, by the computer, all result sets from the plurality of distributed computers; applying, by the computer, rule filtering and outputting remaining groups of events; and representing, by the computer, the remaining groups of events as a distributed graph to output merged groups of temporally correlated events.

According to another embodiment, a system for scalable mining of temporally correlated events is disclosed. The computer system comprises a computer comprising at least one processor, one or more memories, one or more computer readable storage media having program instructions executable by the computer to perform the program instructions. The program instructions comprising: recording, by the computer event occurrences as bitmaps at least at a fine grained interval and a coarse grained interval into a bitmap data structure; filtering out, by the computer, events occurrences which occur above and below a minimum and maximum designated thresholds relative to the fine grained interval and the coarse grained interval; identifying, by the computer, events occurrences having a same event occurrence bitmap at the fine grained interval and the coarse grained interval and placing the same event occurrence bitmaps into groups; removing, by the computer, duplicate event occurrence bitmaps at the fine grained intervals within the groups; creating, by the computer, transactions based on the groups; for each transaction created, applying, by the computer, optimized parallel frequent pattern growth to a plurality of other distributed computers to produce result sets; merging, by the computer, all result sets from the plurality of distributed computers; applying, by the computer, rule filtering and outputting remaining groups of events; and representing, by the computer, the remaining groups of events as a distributed graph to output merged groups of temporally correlated events.

DETAILED DESCRIPTION

Figure 1:
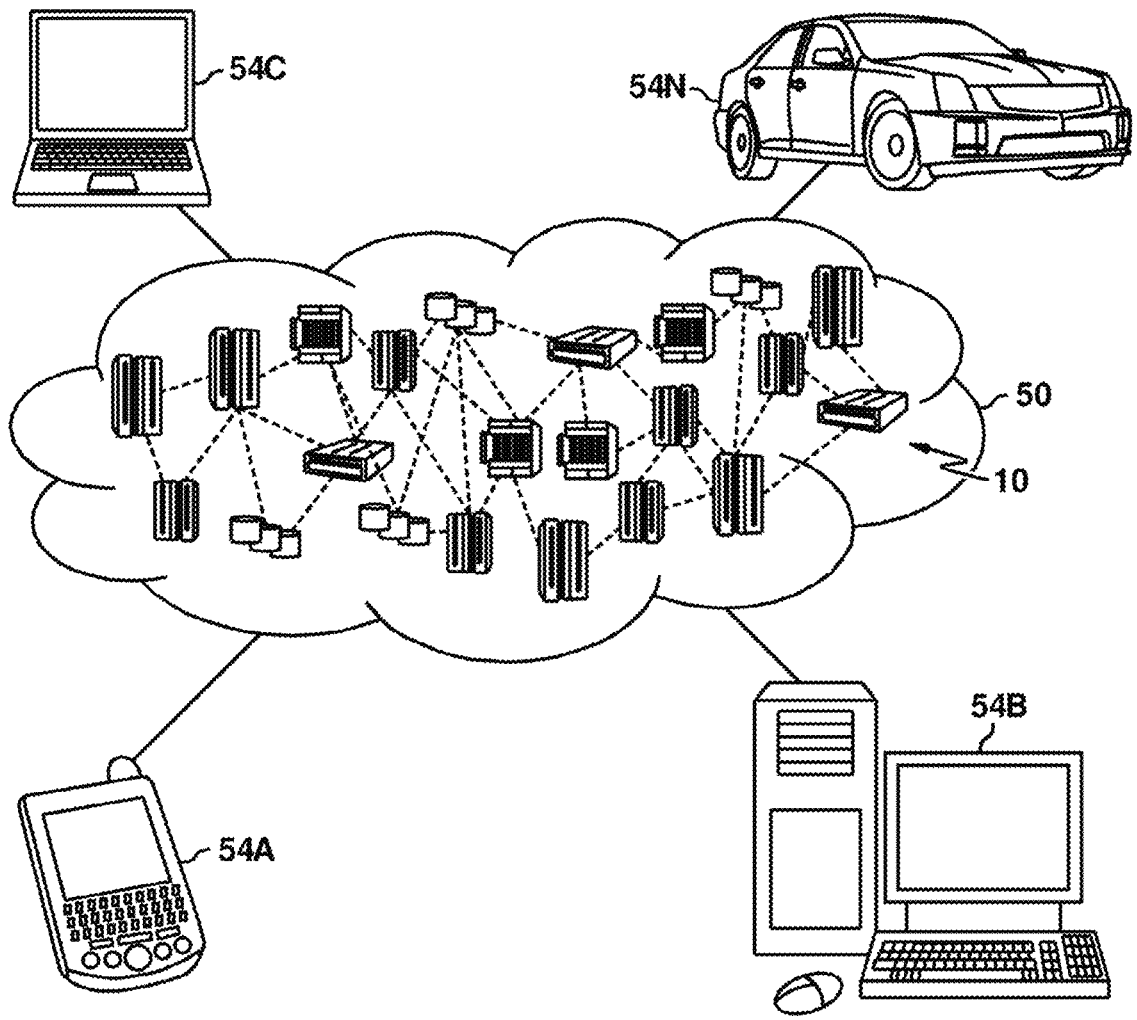
FIG. 1 depicts a cloud computing node according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

In an embodiment of the present invention, it is recognized that a method to find events that are temporally correlated is disclosed. The term "temporally correlated" refers to when seemingly separate problems or events occur and tend to co-occur and the associated relationship between such events. It should be noted that an assumption is made that the more often events co-occur, the higher the likelihood that the events are related. When this type of event relationship overlaps with node-related events or topologically-related events, a powerful linkage between events can be difficult to detect, but provides significant added context to a NOC user. The method of an embodiment of the present invention is scalable and merges multiple event relationships into a coherent structure that can be presented to an end NOC user, so that actions can be taken by the NOC user.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
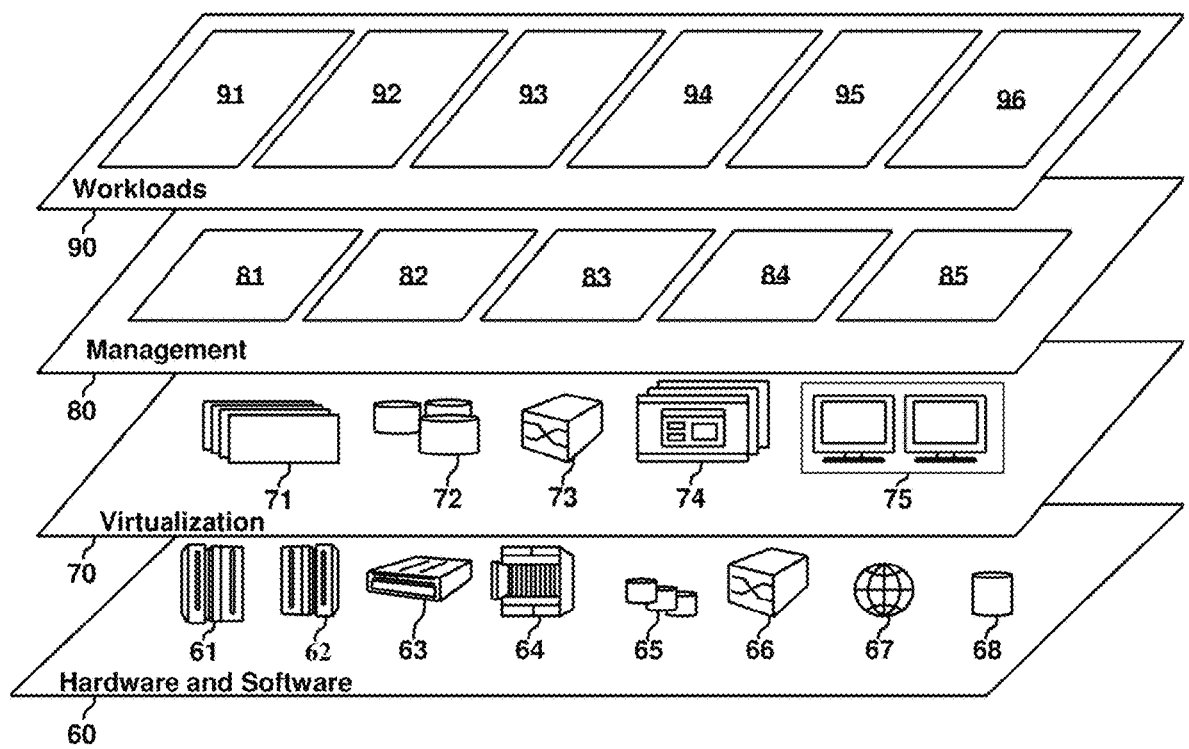
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and scalable mining of temporally correlated events 96.

Figure 5:
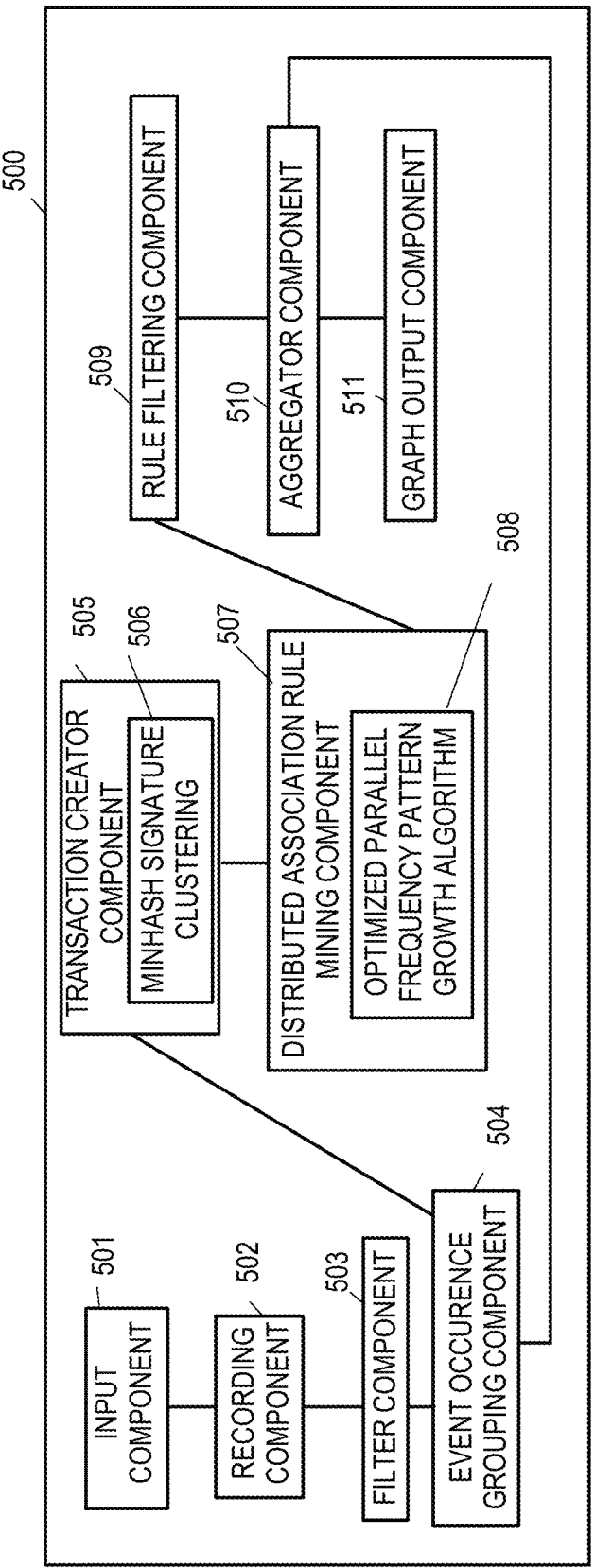
FIG. 5 depicts an example of a scalable mining module.

FIG. 5 shows an example of scalable mining module 500 which can be used to execute the method via the cloud environment. The scalable mining module 500 can be executed within a computing system 400 as a software program 414 described in further detail below. An input component 501 receives training data such as bitmaps as well as observation event occurrences that occur at a fine-grained and course-grained intervals. The recording component 502 receives data from the input component 501 and records observation event occurrences at the fine-grained and course-grained intervals. The filter component 503 filters the recorded event occurrences relative to designated thresholds. An event occurrence grouping component 504 groups event occurrence bitmaps together and removes duplicated bitmaps in the groups, for example at the fine-grained interval. The event occurrence grouping component 504 provides input to the transaction creator component 505 and the aggregator component 510. The transaction creator component 505 creates transaction based on the groups of event occurrences via minhash signature clustering 506. The transaction creator component 505 provides input to the distributed association rule mining component 507. The distributed association rule mining component 507 via an optimized parallel frequency pattern growth algorithm 508 produces result sets for each transaction created which are outputted to the rule filtering component 509. The rule filtering component 509 filters the group of events. The aggregator component 510 aggregates results sets from the rule filtering component 509. The graph output 511 graphically outputs the results sets.

Figure 3:
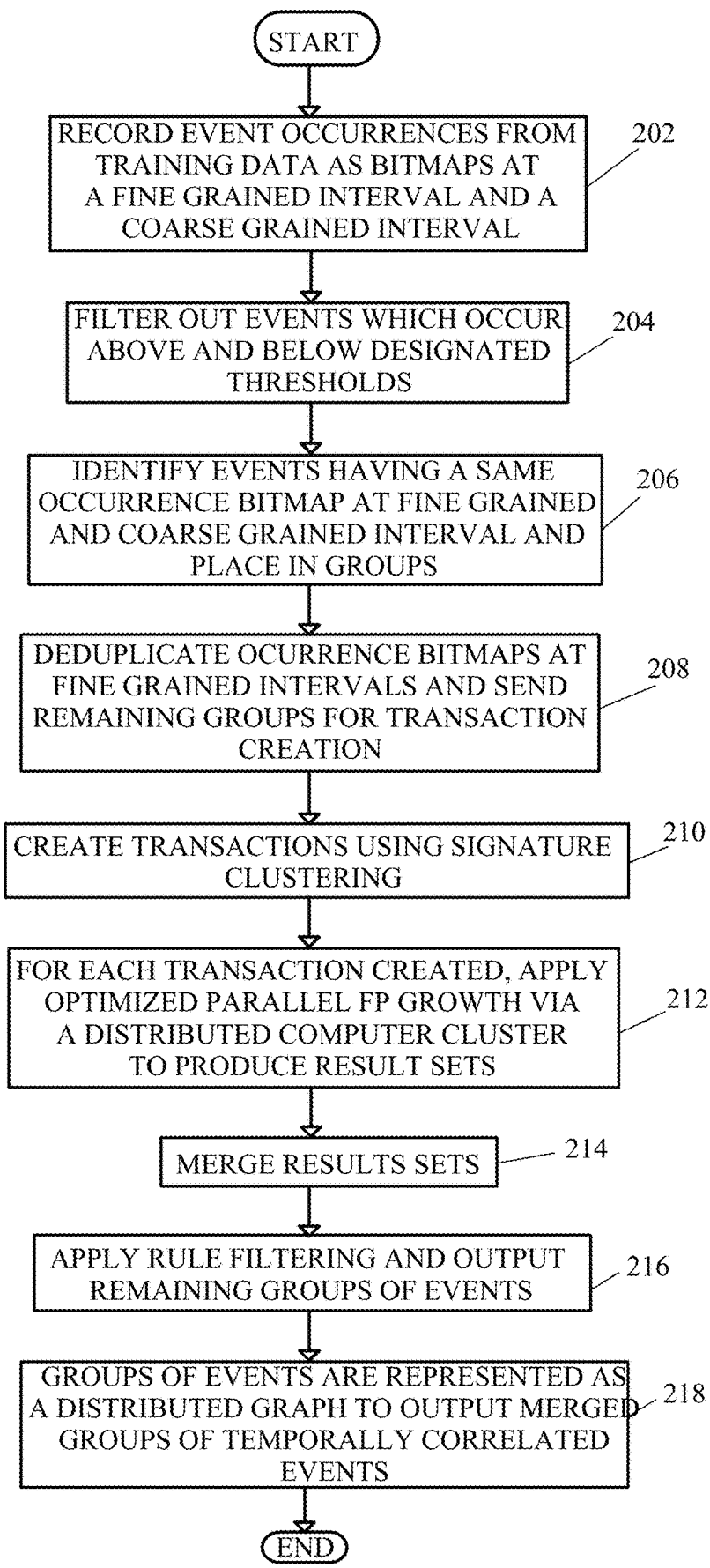
FIG. 3 shows a flow diagram of a method of scalable mining of temporally related events.

FIG. 3 shows a flow diagram of a method of scalable mining of temporally correlated events within a cloud computing environment. It will be recognized that embodiments of the method are preferably chained together into a distributed processing pipeline to be executed in a PaaS cloud environment using the scalable mining module of FIG. 5. For example, the distributed processing pipeline could use Apache Spark™ via a Spark cluster. All tasks within the entire processing flow are executed on worker nodes and therefore, the processing is fast and horizontally scalable.

It should be noted that prior to step 202 of the method, training events occurrences within the cloud environment are recorded from training data as bitmaps at least at a fine-grained interval and a coarse-grained interval and stored in a bitmap data structure. Bitmaps provide a categorical representation of each event over the training time period sampled at a fixed interval. Bitmaps allows for computationally efficient comparison of events with similar temporal 'fingerprints' and allows for quick identification of events with the same fingerprints. The use of multiple intervals allows for multiple fingerprints per event and a higher chance of identifying similar fingerprints.

In a first step (step 202), observation event occurrences are recorded into a highly optimized bitmap data structure. The recording takes place at a fine-grained interval and a coarse-grained interval, such as 2 minutes and 10 minutes. Other time intervals may additionally be used.

For example, assuming that a small input dataset contains event occurrences within 60 minutes from 12:00 to 13:00. When the 2 minute interval is used, there is a total of 30 slots (60 minutes/2 minutes). Event occurrences are aggregated. In this example, 2 occurrences at 12:04 and 12:05 will result in only 1 bit being set at position 2. The bitmap representation of this example event is 001000000000000000000000000000. Note that event occurrences are aggregated, e.g. 2 occurrences at 12:04 and 12:05 will result in only 1 bit being set at position 2 (it's 0-indexed). When a 10 minute interval is used, there is a total of 6 slots (60 minutes/10 minutes) and the bit setting is carried out similarly. The same example event above happening at 12:04 and 12:05 would have a representation of 100000. Converting the raw data into bitmap representation at various resolutions enables multiple views of the same dataset.

Next, events occurrences are filtered out which occur above and below designated thresholds (step 204). Event occurrences that are too rare or event occurrences that occur less than a minimum threshold and event occurrences that are too frequent are events that occur above a maximum threshold are removed from the dataset.

Based on the example discussed above, the minimum threshold was set to be 3, and the max threshold was set to be 80% of the number of possible slots. The max threshold is 80% of 30 possible slots in the fine-grained interval representation is equal to 24, and the min threshold is always 3. An event that only occurred twice at 12:04 and 12:05 as in the above example will be filtered out. Another event which occurred at 12:04, 12:05, 12:24, 12:35, 12:44, 12:45, 12:50 will be kept for further analysis. An event that occurred more than 24 times, e.g. at 12:04, 12:05, 12:07, 12:09, 12:12, 12:14, 12:15, 12:17, 12:18, 12:20, 12:24, 12:25, 12:26, 12:28, 12:29, 12:30, 12:35, 12:37, 12:39, 12:40, 12:41, 12:43, 12:44, 12:45, 12:50, 12:53, 12:55 will be filtered out because it occurred too frequently within the period in question. Note that this filtering is not done based on the max number of slots in the coarse-grained interval representation. It should also be noted that in the example a one hour period is used for ease of understanding, and would not be used as the one hour time period is too short to accurately mine for any correlations.

Event occurrences having the same event occurrence bitmap within the bitmap data structure at the fine-grained interval and the coarse-grained interval are identified and placed in groups (step 206). At each aggregation interval of either fine-grained or coarse-grained, event occurrences which have the same bitmap are grouped together. This step may be carried out in linear time via a hash table.

Using the same example time period as discussed above between 12:00 and 13:00, the events that pass the filtering step (min threshold (e.g. 3)≤occurrence count≤maximum threshold (e.g. 24) in this example) are tracked. Attr1 and attr2 are additional attributes that will not be discussed relative to this example but are listed for completeness. Additional The set of events can include the following:

Event 1 (id=e1, fine grained bitmap representation=00100 01000 00010 00100 00000 00000, coarse grained bitmap representation=111100, attr1=val11, attr2=val12);

Event 2 (id=e2, fine grained bitmap representation=01110 01000 00010 00100 00000 00000, coarse grained bitmap representation=111100, attr1=val21, attr2=val22);

Event 3 (id=e3, fine grained bitmap representation=01110 01000 00010 00100 00000 00000, coarse grained bitmap representation=111100, attr1=val31, attr2=val32);

Event 4 (id=e4, fine grained bitmap representation=00000 01000 00010 00100 10000 00000, coarse grained bitmap representation=011110, attr1=val41, attr2=val42);

Event 5 (id=e5, fine grained bitmap representation=00010 00000 00010 00100 00000 01110, coarse grained bitmap representation=101101, attr1=val51, attr2=val52); and Event 6 (id=e6, fine grained bitmap representation=00100 00000 01110 10100 00000 00100, coarse grained bitmap representation=101101, attr1=val61, attr2=val62).

The events would be placed into two hash tables, Hash Table 1 and Hash Table 2.

Hashtable1:
Key=00100 01000 00010 00100 00000 00000, Value=Event1
Key=01110 01000 00010 00100 00000 00000, Value=Event2, Event3
Key=00000 01000 00010 00100 10000 00000, Value=Event4
Key=00010 00000 00010 00100 00000 01110, Value=Event5
Key=00100 00000 01110 10100 00000 00100, Value=Event6

HashTable 2:
Key=111100, Value=Event, Event2, Event3
Key=011110, Value=Event4
Key=101101, Value=Event5, Event6

Duplicated bitmaps of event occurrences at the fine-grained interval in the groups are removed, resulting in updated groups which are used for the next step of transaction creation (step 208), such that only one representative event occurrence bitmap from each group remains in the dataset to be used.

Transactions are then created based on the updated groups using signature clustering via two different windows (step 210).

Transaction creation takes place using one or more, preferably at least two, different sliding windows, for example using MinHash signature clustering. The training data recorded prior to the method of FIG. 3 is a sequence of historical events that are not transactional in nature and is used to determine the two different sliding windows applied as discussed below. A prerequisite for applying association rule mining methods is that the data set consists of transactions, each of which subsequently contains a set of items. As time is the most important aspect of events in this use case, the transactions are created based on a long sequence of time based events, for example using a sliding window, and placing events happening within this window into a transaction to create a single transaction. Each event is represented by a set of MinHash signatures which are then compared to other events using KMeans++ clustering. Transactions are a set of events which occur in a given time window. Using MinHash allows the splitting of a single transaction that is too large due to too many events occurring in a given time frame.

An example of high level pseudocode associated with step 210 is shown below.

```
Initialize k as the number of hash functions
Initialize HASH_PRIME as a large prime number
Initialize k pairs of (a_i, b_i) random values to be used as coefficients in hash functions
Generate k hash functions in the form of h_i(x)=(x*a_i+b_i)% HASH_PRIME
For each event e
    Retrieve the set of positions P within the overall training window that it occurred, i.e.
the positions of set bits in its bitmap representation
        Initialize min_hash as an array of size k
        For each hash function h_i:
            min_hash_i=Double.MAX_VALUE
            For each position p in P:
                hash=h_i(p)
                if(hash<min_hash_i)
                    min_hash_i=hash
                min-hash[i]=min_hash_i
    Add min_hash to the collection of MinHash signatures S
```

A clustering algorithm, for example KMeans++ can be used on the MinHash signatures S to find events with approximately similar MinHash signatures. The distance function to be used in such a clustering algorithm is the hash distance, for example using binary checks. An example of pseudocode for the binary check is:

```
//Assume a and b are two double arrays holding MinHash signatures
int distance =0;
for (int i=0; i<a.length; i++){
    if (Double.compare(a[i], b[i])!=0)
        distance++;
}
return distance;
```

It is noted that the above process of clustering on MinHash signatures is carried out on a per large transaction basis. If the resulting smaller transactions are still larger than a predefined threshold, a post processing step to split the transaction again by sorting event occurrences by the first set bit and then by the last set bit can be executed. The sorted list of event occurrences is then iterated over and chunks of event occurrences of the predefined threshold sized are returned as transactions represented as a MinHash signature.

For each transaction created, distributed association rule mining via a distributed computer is applied to produce result sets (step 212).

There are a number of concerns with splitting a sequence of events into transactions based on time event occurrences as events occurring just outside of a sliding window and the count of event occurrences inside a sliding window are ignored. To address the concern of transactions based on time events occurring just outside of a sliding window, which can cause an event to be in a different transaction than its neighbors just because of the sliding window boundaries, the method runs the rule mining twice. The first execution of the rule mining occurs within a sliding window and a second execution of the rule mining occurs within another sliding window of the same length, but offset by 50% of that length. This allows for an ensemble training whereby multiple miners are run on the same dataset from different points of view. This approach however has a disadvantage in that the mining process incurs cost as the process has to be run twice.

The distributed association rule mining is preferably an optimized parallel frequent pattern (FP) growth algorithm which is different from a conventional parallel FP growth algorithm. The conventional parallel FP growth algorithm requires building of FP trees and recursions, while the optimized parallel FP growth algorithm of the present invention does not, which significantly speeds up processing and reduces memory used. Furthermore, the optimized parallel FP growth algorithm uses rules consisting of one event as the antecedent and one event as the consequent.

An example of the pseudocode for the optimized parallel FP growth algorithm is shown below as well as filtering out events which have a number of occurrences below a configurable fixed threshold:

```
Input: a collection of transactions T, a support threshold minCount, cooccurrence
threshold minCooccurrence and a co-occurrence likelihood threshold
minCooccurrenceLikelihood
SimplifiedParallelIFPgrowth(T, minCount, minCooccurrence,
minCooccurrenceLikelihood):
        Count the frequencies of all items in the dataset and cache this result
/*
    Filter out items whose counts are below minCount
    For each transaction in T:
            Generate conditional transactions. The output of this operation is a collection of
            tuples containing key-value pairs. In each such key-value tuple, the key is (the rank
            of) an element and the value is an array of (the ranks of) other elements occurring
            with it in this transaction
    Aggregate those tuples by key to obtain an accumulation of the number of times other
    elements co-occurred with the element represented by the key. This accumulation can be
    stored in an efficient data structure such as a HashMultiset.
    Extract frequent itemsets of size 2 from the collection of key value pair tuples from the
    previous step. Each candidate itemset must have a frequency of at least minCount.
    (When we use ranks instead of the original elements we need to do a lookup to generate
    frequent itemsets containing the original elements.
```

For each transaction T, conditional transactions are generated. The output of this operation is a collection of tuples containing key-value pairs. In each such key-value tuple, the key is the rank of an element and the value is an array of the ranks of other elements occurring within each transaction.

Two known disadvantages of using a distributed association ruling mining method such as a conventional parallel FP growth algorithm, are that the rule mining method needs to be run twice to account for boundary issues which were discussed above, and that the method has issues with transactions of large sizes.

It should be noted that to address these issues in conventional parallel FP growth algorithm, the present invention first splits these large transactions into smaller ones via MinHash signatures (see step 210). An advantage of using MinHash signatures is that the dissimilarity of two object's MinHash signatures is equal to a Jaccard distance and MinHash signatures are constructed from a much smaller number of hash functions compared to the number of dimension of the bitmap data structure, which was equal to the number of possible time slots spanning the training dataset. In addition, the MinHash signatures also take the count of events inside a sliding window into account, thereby addressing the large transaction sizes, alleviating the need to run the distributed association rule mining multiple times. The present invention runs the distributed association ruling mining once for each sliding window instead.

The target input event data for the parallel FP growth algorithm on a Spark cluster comes from dynamic and distributed environments within a cloud environment. The output of the parallel FP growth algorithm are key value pair tuples which were generated in step 212. In a use case, the lack of clock synchronization is important to note—for instance, event e1 was generated at a time t1 from a particular server and event e2 from a different server at time t2 and t1 is a few milliseconds before t2. Since there is no guarantee that the clocks on different servers are synchronized, one cannot assume that e1 happened before e2. Therefore, the method of the present invention is not focused on establishing such relationships based on an event's order of appearance and is avoiding single directional rules with low correlation.

For example, event e1 occurred at t1, t2, and t3 and event e2 occurred at t1, t2 and t3 and another thousand timestamps after t3. The method of the present invention is not concerned with generating a rule e1>e2, even though the confidence of this rule is high, because the correlation is too low to be of interest. The method of the present invention treats the temporal correlation relationship as transitive, as in, if event e1 and e2 are related and in addition e2 is related to e3, then e1 is treated as related to e3 as well. As such, the method of the present invention is preferably interested in relationships between pairs of events, for example the antecedent and consequent item sets which are both of a same, e.g. size 1, since the relationships across events can be fused together at a later stage.

The results sets are then aggregated (step 214). The result sets are preferably key value pair tuples. The key-value pair tuples are aggregated by key to obtain an accumulation of the number of times other elements co-occurred with the element represented by the key. This accumulation can be stored in an efficient data structure such as a HashMultiset.

A rule filtering is applied and groups of events are outputted (step 216).

Rule filtering preferably includes three checks. A first check of the ratio of the number of first event occurrences has to be greater than or equal to a threshold. The rules which have been filtered out have not co-occurred enough to be statistically significant. A second check in which for each first event occurrence of the antecedent, there is a check if there is a first event occurrence in the consequent within a pre-defined window of time and if true, the count is increased by one. This count has to be equal or greater than the minCooccurrence threshold. The ratio of this count over the total first event occurrences of the antecedent has to be greater than or equal to the minCooccurrenceLikelihood threshold. A third check in which for each first occurrence of the consequent, there is a check if there is a first occurrence in the antecedent within a pre-defined window of time and if true, the count is increased by one. This count has to be equal or greater than the minCooccurrence threshold. The ratio of this count over the total first occurrences of the consequent has to be greater than or equal to the minCooccurrenceLikelihood threshold. The checks filter out relationships which are not always valid, for example if the antecedent often occurs independently of the consequent.

For example, frequent item sets of size 2 from the collection of key-value pairs tuples are extracted. Each candidate item set has to have a frequency of at least minCount. Once the frequent item sets are found, association rules using the threshold minConfidence are generated. Cached frequencies of all items are used for the merge to avoid an expensive join. This is possible since the antecedent size is always one. As discussed above, the method is not interested in the direction of rules.

An example of the pseudocode of the aggregation and rule filtering of steps 214 and 216 is shown below:

```
GenerateIndirectionalRules(freqItemsets, itemToFreq, minCooccurrence,
minCooccurrenceLikelihood):
    For each frequent item set fis containing (X,Y) in freqItemsets:
        Generate tuple t=(X((Y, freq(X union Y)), freq(X))), where freq(X union Y) is
        available from fis, freq(X) can be looked up directly from the cache itemToFreq
        Generate Rules
        Filter rules using the minCooccurrence and minCooccurrenceLikelihood threshold
        Re-order the antecedent and the consequent in each rule by their lexicographical
        order
    Deduplicate the re-ordered rules and return
return rules
```

Next, the groups of events are represented as a distributed graph to output merged groups of temporally correlated events (step 218), for example to a NOC user, and the method ends.

The modified FP-Growth algorithm identifies binary rules between events. This outlined component takes these rules as input and represents them as a distributed graph. Each edge between two vertices in the graph is a binary rule from the modified FP-Growth algorithm.

Forming this graph, groups of transitively connected vertices are found and grouped together via connected components to form groups (sets) of temporally related events which consist of all rules which are immediately or transitively related by the binary rules.

For example, event 'a' is found to be temporally related to event 'b' by the optimized FP growth based method of the present invention, event 'k' has exactly the same fingerprint as event 'l', hence also temporally related. Event 'e' is topologically related to event 'f'. In order to group or merge together many such pairs of relationships, a graph-based approach was used. The graph based approach includes the following steps:

0: Initialize an empty graph G(V,E) where vertices V are events, edges E are relationships
1: For each relationship pair, add the pair to G (events to V and relationship to E)
2. Run an algorithm to find connected components in G (this can be run in linear time)
3. Return the connected components as the merged groups.

It should be noted that in the prior art, merging pairs of relationships includes iterating over all available pairs, and for each such pair, finding any pairs, among the rest that have common event results, which results in a quadratic run time implementation which is very slow and not scalable.

The method of embodiments of the present invention use scalable mining that can work with input data that is non-transactional in nature and detect high correlation relationships between events with low support thresholds. Additionally, the embodiments of the method of the present invention can manage a large scale of input data by executing the mining process in a distributed manner in a clustered cloud environment via nodes.

Figure 4:
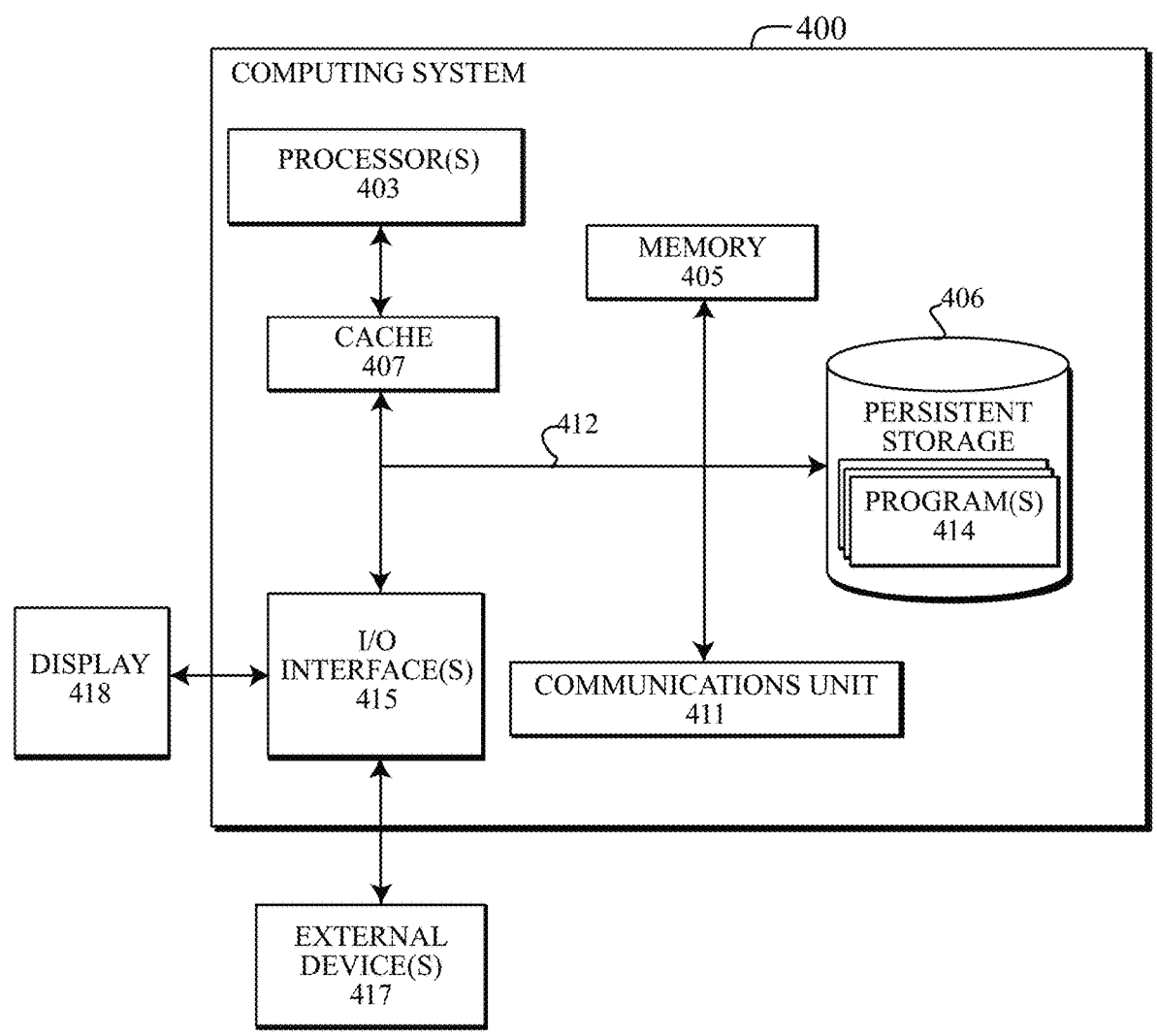
FIG. 4 depicts an embodiment of a block diagram of internal and external components of computing system in which embodiments described herein may be implemented in accordance with the present disclosure.

FIG. 4 illustrates a block diagram of a simplified example of a computing system 400, capable of performing one or more computing operations described herein. Computing system 400 may be representative of the one or more nodes depicted in the cloud computing environment as shown in FIGS. 2-3, and in accordance with the embodiments of the present disclosure described herein. It should be appreciated that FIG. 4 provides only an illustration of one implementation of a computing system 400 and does not imply any limitations with regard to the environments in which different embodiments may be implemented. In general, the components illustrated in FIG. 4 may be representative of any electronic device capable of executing machine-readable program instructions.

While FIG. 4 shows one example of a computing system, a computing system 400 may take many different forms, both real and virtualized. For example, computing systems can take the form of personal desktop computer systems, laptops, notebooks, tablets, servers, client devices, network devices, network terminals, thin clients, thick clients, kiosks, mobile communication devices (e.g., smartphones), augmented reality (AR) devices, virtual reality (VR) headsets, multiprocessor systems, microprocessor-based systems, minicomputer systems, mainframe computer systems, smart devices (i.e. smart glasses, smartwatches, etc.), or Internet-of-Things (IoT) devices and sensors. The computing systems can operate in a networked computing environment, containerized computing environment, a distributed cloud computing environment, a serverless computing environment, and/or a combination of environments thereof, which can include any of the systems or devices described herein and/or additional computing devices or systems known or used by a person of ordinary skill in the art.

Computing system 400 may include communications fabric 412, which can provide for electronic communications between one or more processor(s) 403, memory 405, persistent storage 406, cache 407, communications unit 411, and one or more input/output (I/O) interface(s) 415. Communications fabric 412 can be implemented with any architecture designed for passing data and/or controlling information between processor(s) 403, memory 405, cache 407, external devices 417, and any other hardware components within a computing system 400. Exemplary embodiments of the communications fabric 412 can be implemented as one or more buses.

Memory 405 and persistent storage 406 may be computer-readable storage media. Embodiments of memory 405 may include random access memory (RAM) and cache 407 memory. In general, memory 405 can include any suitable volatile or non-volatile computer-readable storage media and may comprise firmware or other software programmed into the memory 405. Software program(s) 414, applications, and services described herein may be stored in memory 405, cache 407 and/or persistent storage 406 for execution and/or access by one or more of the respective processor(s) 403 of the data processing system 400.

Persistent storage 406 may include a plurality of magnetic hard disk drives. Alternatively, or in addition to magnetic hard disk drives, persistent storage 406 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 406 can also be removable. For example, a removable hard drive can be used for persistent storage 406. Other examples include optical and magnetic disks, thumb drives, and smart cards that are inserted into a drive for transfer onto another computer-readable storage medium that is also part of persistent storage 406.

Communications unit 411 provides for the facilitation of electronic communications between computing systems 400. For example, between one or more nodes or end-user devices of a cloud network. In the exemplary embodiment, communications unit 411 may include network adapters or interfaces such as a Transmission Control Protocol/Internet Protocol (TCP/IP) adapter cards, wireless Wi-Fi interface cards or antenna, 3G, 4G, or 5G cellular network interface cards or other wired and/or wireless communication links. Communication networks can comprise, for example, copper wires, optical fibers, wireless transmission, routers, firewalls, switches, gateway computers, edge servers and/or other network hardware and virtualized components thereof, which may be part of, or connect to, nodes of the communication networks' devices, systems, hosts, terminals or other network computer systems. Software and data used to practice embodiments of the present invention can be downloaded to the computer systems 400 operating in a network environment through communications unit 411 (e.g., via the Internet, a local area network or other wide area networks). From communications unit 411, the software and the data of program(s) 414, applications or services can be loaded into persistent storage 406 or stored within memory 405 and/or cache 407.

One or more input/output (I/O) interfaces 415 may allow for input and output of data with other devices that may be connected to the data processing system 400. For example, I/O interface 415 can provide a connection to one or more external devices 417 such as one or more, Internet of Things (IoT) devices or sensors, recording devices such as an audio recording devices, microphones, cameras, input devices such as a keyboard, computer mouse, touch screen, virtual keyboard, touchpad, pointing device, or other human interface devices. External devices 417 can also include portable computer-readable storage media such as, for example, thumb drives, portable optical or magnetic disks, and memory cards. I/O interface 415 may connect to human-readable display device 418. The human-readable display device 418 provides a mechanism to display data to a user and can be, for example, a computer monitor, screen, television, projector, display panel, etc. Display devices 418 can also be an incorporated display and may function as a touch screen as part of a built-in display of a tablet computer or mobile computing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of scalable mining of temporally correlated events comprising the steps of:
    a computer recording event occurrences as bitmaps at least at a fine grained interval and a coarse grained interval into a bitmap data structure;
    the computer filtering out events occurrences which occur above and below a minimum and maximum designated thresholds relative to the fine grained interval and the coarse grained interval;
    the computer identifying events occurrences having a same event occurrence bitmap at the fine grained interval and the coarse grained interval and placing the same event occurrence bitmaps into groups;
    the computer removing duplicate event occurrence bitmaps at the fine grained intervals within the groups;
    the computer creating transactions based on the groups, wherein the transactions are created using a first sliding window and a second sliding window, with event occurrences present in the first sliding window are created as a first single transaction and event occurrences in the second sliding window are created as a second single transaction;

for each transaction created, applying optimized parallel frequent pattern growth to a plurality of other distributed computers to produce result sets;

the computer merging the result sets from the plurality of distributed computers;

the computer applying rule filtering and outputting remaining groups of events; and the computer representing the remaining groups as a distributed graph to output merged groups of temporally correlated events.

2. The method of claim 1, wherein the result sets are key value pair tuples.

3. The method of claim 2, wherein the merging of the result sets is carried out by key.

4. The method of claim 1, wherein the rule filtering comprises a computer:

determining of a ratio of a number of first event occurrences is greater than or equal to a threshold;

for each first event occurrence of an antecedent with a corresponding a first event occurrence is present in a consequent, increasing a count by one, wherein a ratio of the count relative to a total of first event occurrences of the antecedent is greater than or equal to a threshold; and for each first event occurrence of a consequent with a corresponding first event occurrence in the antecedent, increasing a count by one, wherein a ratio of the count relative to a total of first event occurrences of the consequent is greater than or equal to the threshold.

5. The method of claim 4, wherein the threshold is a minCooccurrence likelihood threshold.

6. The method of claim 1, wherein the transactions are created using MinHash signature clustering.

7. The method of claim 1, wherein identifying events occurrences having a same event occurrence bitmap at the fine grained interval and the coarse grained interval and placing the same event occurrence bitmaps into groups is carried out in linear time via a hash table.

8. A computer program product for scalable mining of temporally correlated events using a computer comprising at least one processor, one or more memories, one or more computer readable storage media, the computer program product comprising a computer readable storage medium having program instructions embodied therewith, the program instructions executable by the computer to perform a method comprising:

recording, by the computer event occurrences as bitmaps at least at a fine grained interval and a coarse grained interval into a bitmap data structure;

filtering out, by the computer, events occurrences which occur above and below a minimum and maximum designated thresholds relative to the fine grained interval and the coarse grained interval;

identifying, by the computer, events occurrences having a same event occurrence bitmap at the fine grained interval and the coarse grained interval and placing the same event occurrence bitmaps into groups;

removing, by the computer, duplicate event occurrence bitmaps at the fine grained intervals within the groups;

creating, by the computer, transactions based on the groups, wherein the transactions are created using a first sliding window and a second sliding window, with event occurrences present in the first sliding window are created as a first single transaction and event occurrences in the second sliding window are created as a second single transaction;

for each transaction created, applying, by the computer, optimized parallel frequent pattern growth to a plurality of other distributed computers to produce result sets;

merging, by the computer, the result sets from the plurality of distributed computers;

applying, by the computer, rule filtering and outputting remaining groups of events; and representing, by the computer, the remaining groups of events as a distributed graph to output merged groups of temporally correlated events.

9. The computer program product of claim 8, wherein the result sets are key value pair tuples.

10. The computer program product of claim 9, wherein the merging of the result sets is carried out by key.

11. The computer program product of claim 8, wherein the rule filtering comprises the computer:

determining of a ratio of a number of first event occurrences is greater than or equal to a threshold;

for each first event occurrence of an antecedent with a corresponding a first event occurrence is present in a consequent, increasing a count by one, wherein a ratio of the count relative to a total of first event occurrences of the antecedent is greater than or equal to a threshold; and for each first event occurrence of a consequent with a corresponding first event occurrence in the antecedent, increasing a count by one, wherein a ratio of the count relative to a total of first event occurrences of the consequent is greater than or equal to the threshold.

12. The computer program product of claim 11, wherein the threshold is a minCooccurrence likelihood threshold.

13. The computer program product of claim 8, wherein the transaction are created using MinHash signature clustering.

14. The computer program product of claim 8, wherein identifying events occurrences having a same event occurrence bitmap at the fine grained interval and the coarse grained interval and placing the same event occurrence bitmaps into groups is carried out in linear time via a hash table.

15. A computer system for scalable mining of temporally correlated events comprising a computer comprising at least one processor, one or more memories, one or more computer readable storage media having program instructions executable by the computer to perform the program instructions comprising:

recording, by the computer event occurrences as bitmaps at least at a fine grained interval and a coarse grained interval into a bitmap data structure;

filtering out, by the computer, events occurrences which occur above and below a minimum and maximum designated thresholds relative to the fine grained interval and the coarse grained interval;

identifying, by the computer, events occurrences having a same event occurrence bitmap at the fine grained interval and the coarse grained interval and placing the same event occurrence bitmaps into groups;

removing, by the computer, duplicate event occurrence bitmaps at the fine grained intervals within the groups;

creating, by the computer, transactions based on the groups, wherein the transactions are created using a first sliding window and a second sliding window, with event occurrences present in the first sliding window are created as a first single transaction and event occurrences in the second sliding window are created as a second single transaction;

for each transaction created, applying, by the computer, optimized parallel frequent pattern growth to a plurality of other distributed computers to produce result sets;

merging, by the computer, the result sets from the plurality of distributed computers;

applying, by the computer, rule filtering and outputting remaining groups of events; and representing, by the computer, the remaining groups of events as a distributed graph to output merged groups of temporally correlated events.

16. The computer system of claim 15, wherein the rule filtering comprises the computer:

determining of a ratio of a number of first event occurrences is greater than or equal to a threshold;

for each first event occurrence of an antecedent with a corresponding a first event occurrence is present in a consequent, increasing a count by one, wherein a ratio of the count relative to a total of first event occurrences of the antecedent is greater than or equal to a threshold; and for each first event occurrence of a consequent with a corresponding first event occurrence in the antecedent, increasing a count by one, wherein a ratio of the count relative to a total of first event occurrences of the consequent is greater than or equal to the threshold.

17. The computer system of claim 16, wherein identifying events occurrences having a same event occurrence bitmap at the fine grained interval and the coarse grained interval and placing the same event occurrence bitmaps into groups is carried out in linear time via a hash table.

* * * * *